United States Patent
Nammi

(10) Patent No.: US 9,100,069 B2
(45) Date of Patent: Aug. 4, 2015

(54) RATE MATCHING FOR HIGH SPEED DEDICATED PHYSICAL CONTROL CHANNEL IN A MULTI ANTENNA WIRELESS COMMUNICATION SYSTEM

(71) Applicant: TELEFONAKTIEBOLAGET L M ERICSSON (PUBL), Stockholm (SE)

(72) Inventor: Sairamesh Nammi, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/006,345

(22) PCT Filed: Jun. 18, 2013

(86) PCT No.: PCT/SE2013/050717
§ 371 (c)(1),
(2) Date: Sep. 20, 2013

(87) PCT Pub. No.: WO2014/038993
PCT Pub. Date: Mar. 13, 2014

(65) Prior Publication Data
US 2014/0072069 A1 Mar. 13, 2014

Related U.S. Application Data
(60) Provisional application No. 61/698,868, filed on Sep. 10, 2012.

(51) Int. Cl.
*H04K 1/10* (2006.01)
*H04B 7/04* (2006.01)
*H04B 7/06* (2006.01)

(52) U.S. Cl.
CPC ............ *H04B 7/0456* (2013.01); *H04B 7/0486* (2013.01); *H04B 7/0636* (2013.01); *H04B 7/0632* (2013.01); *H04B 7/0639* (2013.01)

(58) Field of Classification Search
CPC ... H04B 7/0486; H04B 7/0456; H04B 7/0636
USPC .......... 375/260, 267, 130; 370/328, 342, 329
See application file for complete search history.

(56) References Cited

U.S. PATENT DOCUMENTS 7,187,699 B1 * 3/2007 Raaf et al. ............... 370/545
2002/0154618 A1 * 10/2002 Kim et al. ............... 370/342

(Continued)

FOREIGN PATENT DOCUMENTS

| EP | 1724978 A2 | 11/2006 |
| WO | 2006075951 A1 | 7/2006 |
| WO | 2010033066 A1 | 3/2010 |

OTHER PUBLICATIONS

3GPP, "3rd Generation Partnership Project; Technical Specification Group Radio Access Network; Multiplexing and channel coding (FDD) (Release 10)", 3GPP TS 25.212 V10.2.0, Mar. 2012, 116 pages.

(Continued)

*Primary Examiner* — Shuwang Liu
*Assistant Examiner* — Helene Tayong
(74) *Attorney, Agent, or Firm* — Rothwell, Figg, Ernst & Manbeck, P.C.

(57) ABSTRACT

In one aspect, a method for encoding control information generated by a user equipment (UE) is provided, where the control information comprises a first bit sequence, a second bit sequence, and a third bit sequence. The method comprises: arranging said bit sequences to produce a bit sequence X1; padding the bit sequence X1 with a bit sequence P1 to produce a bit sequence X1'; convolution encoding the bit sequence X1' to produce an encoded bit sequence Z1; and puncturing the bit sequence Z1 using a predefined puncturing pattern to produce a bit sequence R1, wherein the predefined puncturing pattern is a rotationally symmetric puncturing pattern.

21 Claims, 18 Drawing Sheets

(56) References Cited

U.S. PATENT DOCUMENTS

| | | | |
|---|---|---|---|
| 2005/0232214 A1* | 10/2005 | Dottling et al. | 370/342 |
| 2006/0156184 A1* | 7/2006 | Kim et al. | 714/758 |
| 2007/0101232 A1* | 5/2007 | Kim et al. | 714/755 |
| 2011/0286544 A1* | 11/2011 | Avudainayagam et al. | 375/295 |
| 2013/0010724 A1* | 1/2013 | Han et al. | 370/329 |
| 2013/0195008 A1* | 8/2013 | Pelletier et al. | 370/328 |
| 2014/0056372 A1* | 2/2014 | Nammi | 375/260 |

OTHER PUBLICATIONS

Ericsson, "Feedback Channel Design for Four Branch MIMO System", 3GPP TSG RAN WG1 Meeting #68, Feb. 6-10, 2012, R1-120361, Agenda Item 6.3.4, 7 pages.

Ericsson, "4-Branch MIMO for HSDPA", 3GPP TSG RAN WG1 Meeting #65, May 9-13, 2011, R1-111763, Agenda Item 5.6, 17 pages.

Nokia Siemens Networks, "UL feedback design for 4-Tx MIMO", 3GPP TSG RAN WG1 Meeting #68bis, Mar. 26-30, 2012, R1-121725, Agenda Item 6.3.4, 4 pages.

Renesas Mobile Europe Ltd., "Remaining issues on feedback design for Four Branch Downlink MIMO", 3GPP TSG-RAN WG1 Meeting #70, Aug. 13-17, 2012, R1-123566,kgende Item 6.3.3, 7 pages.

International Search Report and Written Opinion issued in related PCT Application No. PCT/SE2012/051010 on Sep. 25, 2013, 12 pages.

\* cited by examiner

| ~~1~~ | ~~2~~ | 3 | 4 |
|---|---|---|---|
| 5 | 6 | 7 | 8 |
| 9 | 10 | 11 | 12 |
| 13 | 14 | 15 | 16 |
| 17 | 18 | 19 | 20 |
| 21 | 22 | 23 | 24 |
| 25 | 26 | 27 | 28 |
| 29 | 30 | 31 | 32 |
| 33 | 34 | 35 | 36 |
| 37 | 38 | 39 | 40 |
| ~~41~~ | ~~42~~ | 43 | 44 |

RATE MATCHING FOR HIGH SPEED DEDICATED PHYSICAL CONTROL CHANNEL IN A MULTI ANTENNA WIRELESS COMMUNICATION SYSTEM

CROSS REFERENCE TO RELATED APPLICATION(S)

This application is a 35 U.S.C. §371 National Phase Entry Application from PCT/SE2013/050717, filed Jun. 18, 2013, which claims priority to U.S. Provisional patent application No. 61/698,868, filed on Sep. 10, 2012. The above identified applications are incorporated by reference in their entirety.

TECHNICAL FIELD

The present disclosure relates to multi antenna wireless communication systems.

BACKGROUND

Several new features are added to the long term High Speed Packet Access (HSPA) evolution in order to meet performance requirements set by the International Mobile Telecommunications Advanced (IMT-A). The main objective of these additional features is to increase average spectral efficiency. One possible technique for improving downlink spectral efficiency is to introduce support for four branch multiple-input multiple-output (MIMO), i.e. utilize up to four transmit and receive antennas to enhance the spatial multiplexing gains and to offer improved beamforming capabilities. Four branch MIMO provides up to 84 Mbps per 5 MHz carrier for high signal to noise ratio (SNR) users and improves the coverage for low SNR users.

The current HSPA system (Release 7-10) supports 1 or 2 transmit antennas at the base station (e.g., NodeB). For these systems, from channel sounding, a user equipment (UE) (e.g., a mobile phone or any other wireless communication device) measures a channel and reports in one sub frame channel state information related to the measured channel. Typically, this report consists of a channel quality indicator (CQI), which explicitly indicates rank indicator (RI), and precoding control indicator (PCI). The UE sends this report periodically for every subframe (TTI). The NodeB uses this report in scheduling the UE.

Introduction of 4-branch MIMO will require a new feedback channel structure to send the CQI/PCI information to the NodeB. To reduce the signaling overhead at downlink and uplink, it was recommended to use two codewords for four branch MIMO. For the uplink signalling channel (HS-DPCCH), it was agreed to use a structure similar to that of 2 Antenna MIMO (Release-7), where the CQI, PCI are sent in one subframe. Hence in total 14 bits are used to report: CQI (8 bits), RI (2 bits) and PCI (4 bits). Since the total number of bits is different compared to that of Release 7 structure of 10 bits, a new encoding is scheme is needed to transmit these bits. Hence to encode these 14 bits in one subframe a convolutional code with 1/3 code rate has been proposed. Unfortunately the puncturing pattern chosen for this scheme is not optimal in terms of packet error performance.

SUMMARY

A method for encoding control information generated by a user equipment (UE) is disclosed. The control information comprises a first bit sequence, a second bit sequence, and a third bit sequence. The method includes: arranging said bit sequences to produce a bit sequence X1; padding the bit sequence X1 with a bit sequence P1 to produce a bit sequence X1'; convolution encoding the bit sequence X1' to produce an encoded bit sequence Z1; and puncturing the bit sequence Z1 using a predefined puncturing pattern to produce a bit sequence R1, wherein the predefined puncturing pattern is a rotationally symmetric puncturing pattern.

The bit sequence Z1 may consist of 44 bits, and the predefined puncturing pattern may be [1 3 42 and 44]. Puncturing the bit sequence Z1 using the predefined puncturing pattern to produce the bit sequence R1 may consist of removing the first bit, the third bit, the forty-second bit, and the forty-fourth bit from the bit sequence Z1. The first bit sequence may be a channel quality indicator, CQI, value; the second bit sequence may be a precoding control indicator, PCI, value; and the third bit sequence is value identifying a preferred number of layers. The bit sequence X1 may consist of fourteen bits, and the bit sequence P1 may consist of eight bits. Convolution encoding the bit sequence X1' to produce the encoded bit sequence Z1 may include convolution encoding the bit sequence X1' using rate 1/2 convolutional encoding.

A user equipment (UE) is disclosed. The UE is adapted to: generate control information, the control information comprising a first bit sequence, a second bit sequence, and a third bit sequence; arrange said bit sequences to produce a bit sequence X1; pad the bit sequence X1 with a bit sequence P1 to produce a bit sequence X1'; convolution encode the bit sequence X1' to produce an encoded bit sequence Z1; and puncture bit sequence Z1 using a predefined puncturing pattern (700, 900) to produce a bit sequence R1. The predefined puncturing pattern is a rotationally symmetric puncturing pattern.

An apparatus for encoding control information is disclosed. The control information includes a first bit sequence, a second bit sequence, and a third bit sequence. The apparatus comprises: a multiplexor adapted to multiplex said bit sequences to produce a bit sequence X1; a padder adapted to pad the bit sequence X1 with a bit sequence P1 to produce a bit sequence X1'; a convolution encoder adapted to convolution encode the bit sequence X1' to produce an encoded bit sequence Z1; and a rate matcher adapted to puncture the bit sequence Z1 using a predefined puncturing pattern to produce a bit sequence R1. The predefined puncturing pattern is a rotationally symmetric puncturing pattern.

BRIEF DESCRIPTION OF THE DRAWINGS

FIG. 6 illustrates an example puncturing pattern.
FIG. 10 illustrates an example puncturing pattern.
FIG. 13 illustrates an example puncturing pattern.
FIG. 14 illustrates an example puncturing pattern.

DETAILED DESCRIPTION OF EMBODIMENTS

Figure 1:
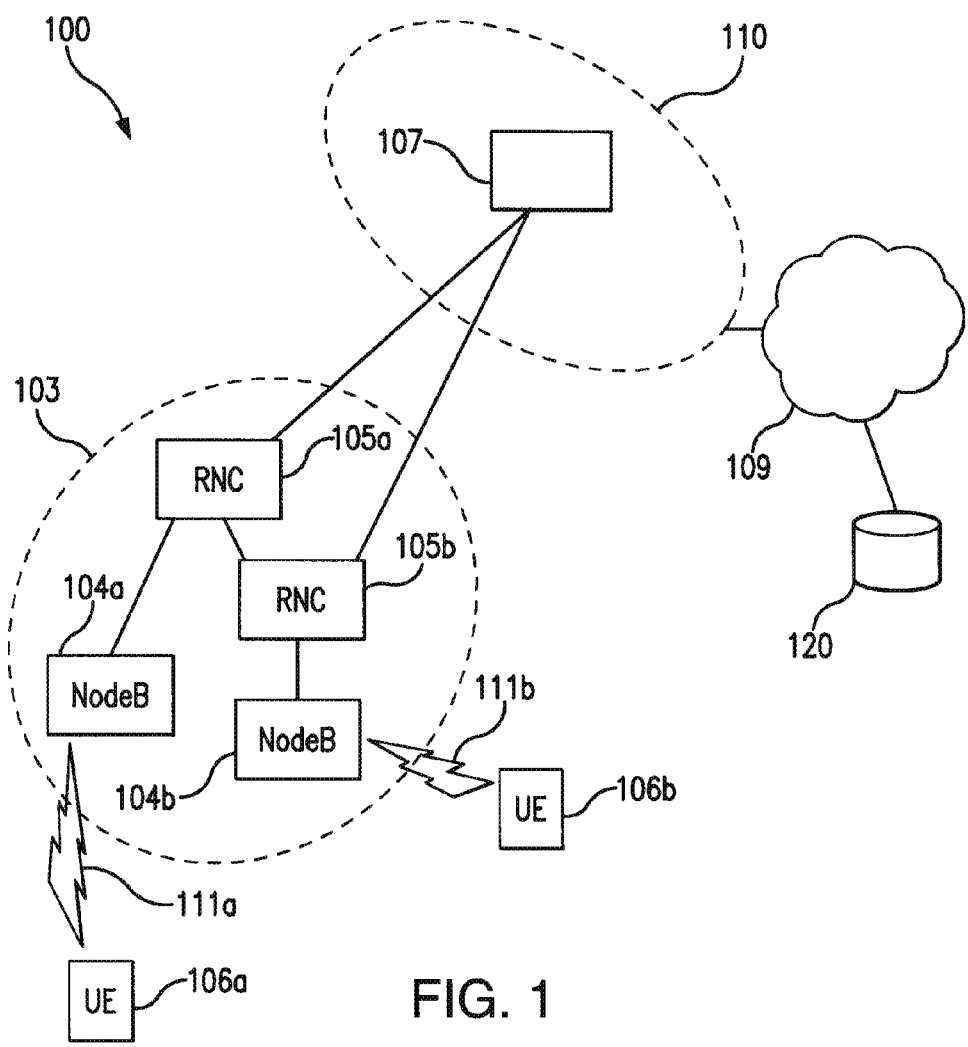
FIG. 1 illustrates an exemplary system.

In one aspect, this disclosure relates to an improved process for encoding control information transmitted from a UE to a base station in a MIMO system. In some embodiments, the process may begin with the UE selecting and/or determining (i.e., "generating") control information to transmit to the base station. The generated control information may include: CQI, RI, and PCI, where each has a corresponding bit sequence. The bit sequences are arranged to produce a bit sequence X1, (in some embodiments X1 is fourteen bits). In some embodiments, the first portion of X1 (e.g., the first eight bits of X1) are for the CQI, the next portion of X1 (e.g., the next two bits) identify the RI (i.e., the bits identify a rank), and the last portion of X1 (e.g., the next four bits of X1) identify a PCI. Next, X1 is padded with bit sequence P1 (in some embodiments P1 is eight bits in length) to produce bit sequence X1'. Bit sequence X1' is convolution encoded to produce encoded bit sequence Z1. Depending on the length of X1' and on the rate of the convolutional encoder, Z1 may be, for example, 44 or 66 bits. For example, when X1' is 22 bits and the rate is 1/2, then Z1=44 bits and when X1' is 22 bits and the rate is 1/3, then Z1=66 bits. The encoded bits Z1 are then punctured by a rate matcher using a predefined rotationally symmetric puncturing pattern to produce bit sequence R1 (in some embodiments Z1 is punctured such that R1 is 40 bits in length). In some embodiments, R1 is then spread by spreading factor 128, QPSK modulated, and transmitted using two slots.

In one particular embodiment, when the rate is 1/3, the following puncturing pattern is used by the rate matcher: [1 2 3 4 5 6 7 8 9 10 11 12 13 54 55 56 57 58 59 60 61 62 63 64 65 66]. That is, bits 1, 2, 3, 4, 5, 6, 7, 8, 9, 10, 11, 12, 13, 54, 55, 56, 57, 58, 59, 60, 61, 62, 63, 64, 65, and 66 are removed from Z1 by rate matcher to produce R1.

In another particular embodiment, when the rate is 1/2 and, the one of the following six puncturing patterns is used by the rate matcher: (1) [1 3 42 44]; (2) [1 2 43 44]; (3) [1 4, 41 44]; (4) [2 3 42 43]; (5) [2 4 41 43]; (6) [3 4 41 42]. That is, for example, if the first puncturing patterns is used, then bits 1, 3, 42 and 44 are removed from Z1 by rate matcher to produce R1.

Preferably, the puncturing pattern used is a "rotationally symmetric" pattern. That is, for each bit n included in the puncturing pattern there exists another bit n' that is also included in the puncturing pattern, wherein n'=(N+1)−n, where N is the bit length of encoded bit sequence Z1. For example, if the puncturing pattern is rotationally symmetric and includes bit 7 and N=66, then the puncturing pattern necessarily also includes bit 60 (i.e., 60=66+1−7). Each of the above identified puncturing patterns is rotationally symmetric.

In another aspect, the disclosure relates to an improved UE for use in a MIMO system. In some embodiments, the improved UE includes a receiver for receiving data intended for the UE. The UE may further include a channel measuring unit for generating control information to send to the base station serving the UE. The generated control information may include: CQI bits (e.g., 8 bits), RI bits (e.g., 2 bits), and PCI bits (e.g., 4 bits). The UE may further include a multiplexor for multiplexing the CQI bits, RI bits, and PCI bits to produce bit sequence X1. In some example embodiments, the first 8 bits of X1 are the CQI bits, the next two bits of X1 are the RI bits, and the last four bits of X1 are the PCI bits (in some embodiments X1 is fourteen bits). The UE may also include a padder that pads X1 with bit sequence P (in some embodiments P is eight bits in length) to produce bit sequence X1'. The UE also includes a convolutional encoder that convolution encodes X1' to produce encoded bit sequence Z1. Depending on the length of X1' and on the rate of the convolutional encoder, Z1 may be, for example, 44 or 66 bits. For example, when X1' is 22 bits and the rate is 1/2, then Z1=44 bits and when X1' is 22 bits and the rate is 1/3, then Z1=66 bits. The encoded bits Z1 are then punctured by a rate matcher using a predefined rotationally symmetric puncturing pattern to produce bit sequence R1 (in some embodiments Z1 is punctured such that R1 is 40 bits in length). The UE may also include modulator and transmitter that then spreads, modulates and transmits R1 in one or more slots.

Referring now to FIG. 1, FIG. 1 illustrates schematically a universal mobile telecommunications system, UMTS, network 100 in which the present methods and apparatuses can be implemented. It should be noted, however, that the skilled person will readily be able to perform implementations in other similar communication systems involving transmission of coded data between nodes.

In FIG. 1 the UMTS network 100 comprises a core network 110 and a UMTS terrestrial radio access network, UTRAN, 103. The UTRAN 103 comprises a number of nodes in the form of radio network controllers (RNC) 105 (e.g., RNCs 105*a,b*), each of which is coupled to a set of neighbouring nodes in the form of one or more base stations 104 (e.g, NodeBs 104*a,b*). Each NodeB 104 is responsible for a given geographical radio cell and the controlling RNC 105 is responsible for routing user and signalling data between that NodeB 104 and the core network 110. All of the RNC's 105 may be coupled to one another. A general outline of the UTRAN 103 is given in 3GPP technical specification TS 25.401 V3.2.0.

FIG. 1 also illustrates communication devices 106 (a.k.a., user equipments (UEs) (e.g., UEs 106*a*, 106*b*) connected to a respective NodeB 104*a*, 104*b* in the UTRAN 103 via a respective air interface 111*a*, 111*b*. UEs served by one NodeB, such as UE 106*a* served by NodeB 104*a*, are located in a so-called radio cell. The core network 110 comprises a number of nodes represented by node 107 and provides communication services to the UE 106 via the UTRAN 103, for example when communicating with the Internet 109 where, schematically, a server 120 illustrates an entity with which the UEs 106 may communicate. As the skilled person realizes, the network 100 in FIG. 1 may comprise a large number of similar functional units in the core network 110 and the UTRAN 103, and in typical realizations of networks, the number of mobile devices may be very large. Furthermore, communication between the nodes in the UTRAN 103 and the UEs 106 may follow the protocols as specified by 3GPP HSPA specifications.

Figure 2:
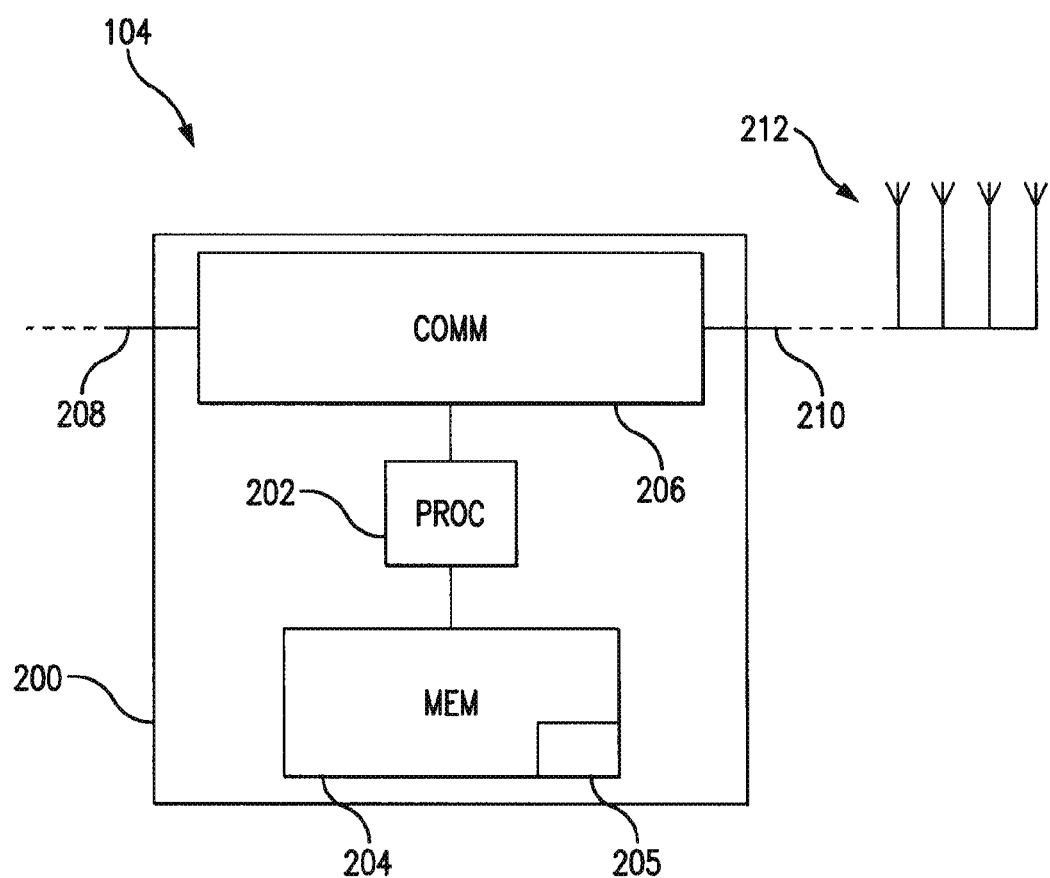
FIG. 2 is a block diagram of an example base station.

FIG. 2 is a functional block diagram schematically illustrating base station 104, according to some embodiments. In the embodiment of FIG. 2, the base station 104 represents a NodeB. The base station 104 comprises processing means, memory means and communication means in the form of a processor 202, a memory 204 and communication circuitry 206. The base station 104 communicates with other nodes via a first data path 208 and via a second data path 210. For example, the first data path 208 can be connected to a RNC and the second data path 210 can connected to one or more antennas 212. The data paths 208, 210 can be any of uplink and downlink data paths, as the skilled person will realize.

Figure 3:
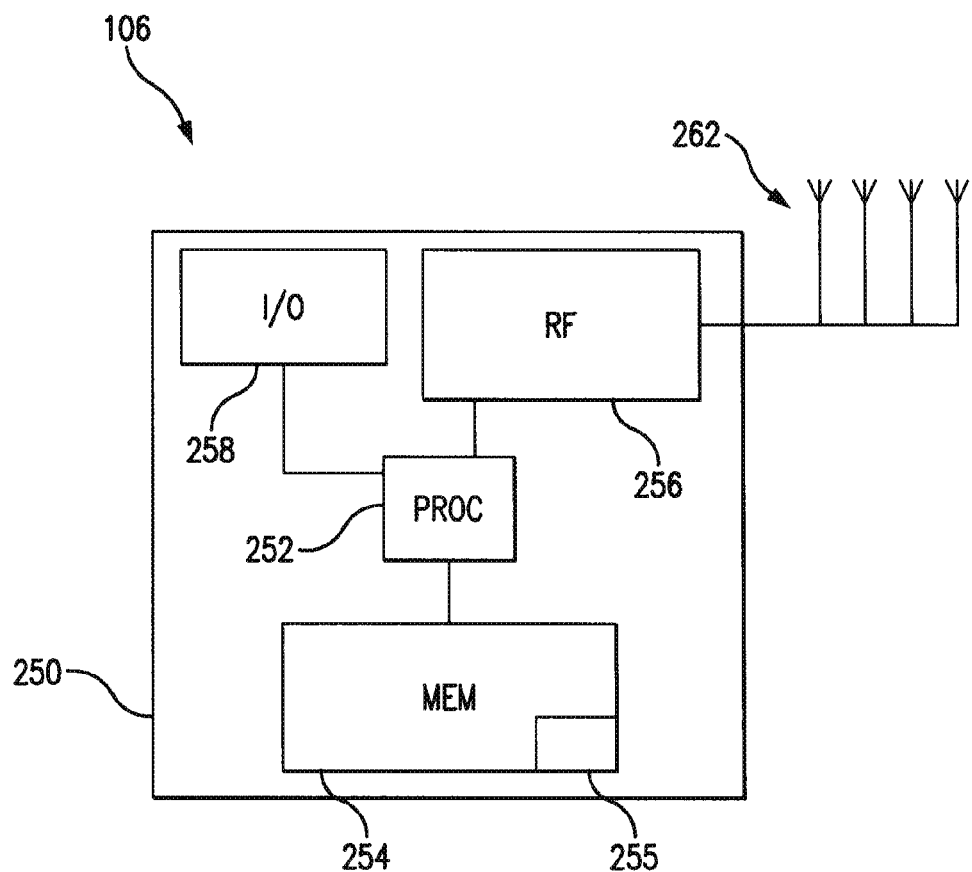
FIG. 3 is a block diagram of an example UE.

FIG. 3 is a functional block diagram schematically illustrating UE 106, according to some embodiments. The UE 106 comprises processing means, memory means and communication means in the form of a processor 252, a memory 254 and radio circuitry 256. The UE 106 communicates with other nodes via a radio air interface with the use of one or more antennas 262. The UE 106 also comprises input/output circuitry 258 in the form of, e.g., a display, a keypad, a microphone, a camera etc.

The methods to be described below can be implemented in the base station 104 and the UE 106, respectively. In such embodiments, the method actions are realized by means of software instructions 205, 255 that are stored in the memory 204, 254 and are executable by the processor 202, 252. Such software instructions 205, 255 can be realized and provided in any suitable way, e.g. provided via the networks 110, 103 or being installed during manufacturing, as the skilled person will realize. Moreover, the memory 204, 254, the processor 202, 252, as well as the communication circuitry 206 and radio circuitry 256 comprise software and/or firmware that, in addition to being configured such that it is capable of implementing the methods to be described, is configured to control the general operation of the base station 104 and the UE 106, respectively, when operating in a cellular mobile communication system such as the system 100 in FIG. 1. However, for the purpose of avoiding unnecessary detail, no further description will be made in the present disclosure regarding this general operation.

Figure 4:
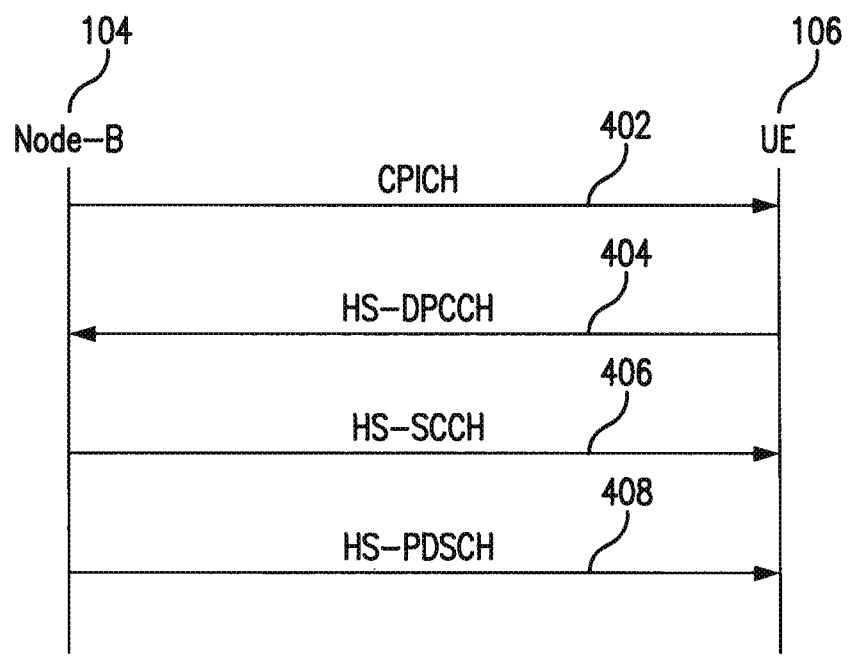
FIG. 4 illustrates a message flow diagram.

Referring now to FIG. 4, FIG. 4 shows an example message exchange between a base station 104 (e.g., NodeB 104) and a UE 106 in a HSDPA system 100. As shown in FIG. 4, the NodeB 104 transmits a pilot signal on a common pilot channel (e.g., the CPICH) 402.

The pilot signal may be broadcast by the base station with constant power and of a known bit sequence. The UE receives the pilot signal and a channel measuring unit of the UE uses the pilot channel to determine a channel quality indicator (CQI) and a precoding channel indicator (PCI).

For two antennas, the CQI is computed as $$CQI = \begin{cases} 15 \times CQI_1 + CQI_2 + 31 & \text{when 2 transport blocks are preferred by the user equipment} \\ CQI_S & \text{when 1 transport block is preferred by the user equipment} \end{cases}$$

where the CQI is the channel quality per individual layer. CQIs is the CQI value in the case of Rank=1. CQI1 and CQI2 are the individual CQI values for each stream in the case of Rank=2.

It can be observed that if the CQI is less than 31, the rank information is 1, otherwise the rank information is 2. The PCI is the precoding information bits selected in the subset of the codebook corresponding to the rank information.

Figure 5A:
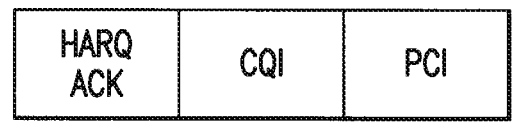
FIG. 5A illustrates a structure of HS-DPCCH for a single carrier.

The CQI and PCI along with other information (e.g., hybrid automatic repeat request (HARQ) acknowledgement/negative acknowledgement (ACK/NAK)) is reported to the NodeB using, for example a high speed dedicated physical control channel (HS-DPCCH) 404. In some embodiments, the periodicity of HS-DPPCH is one subframe (2 msec). The structure of HS-DPCCH for a single carrier is shown in FIG. 5a.

Once the NodeB receives this information, it allocates the required channelization codes, modulation and coding, precoding channel index to the UE after scheduling. This information 406 is conveyed to UE by shared control channel (HS-SCCH). Once the UE detects the HS-SCCH, downlink transmission 408 starts through data traffic channel using Physical Downlink Shared Channel (HS-PDSCH).

For a 4 branch MIMO, the UE transmits, to the base station via the HS-DPCCH, the following information: HARQ ACK information (same structure that of Release-7); CQI (8 bits); RI (i.e., information indicating the number of layers the UE prefers) (2 bits); and PCI (Precoding Control Index in the RI) (4 bits). Hence if we compare the structure with respect to Release 7 MIMO, we need to add additional bits for reporting PCI and RI. From a structure that has been proposed, the reporting is shown in FIG. 5B.

Figure 5B:
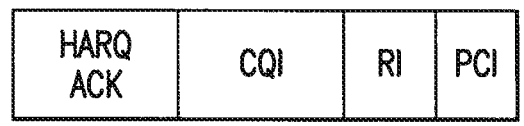
FIG. 5B illustrates another structure for HS-DPCCH.
Figure 6:
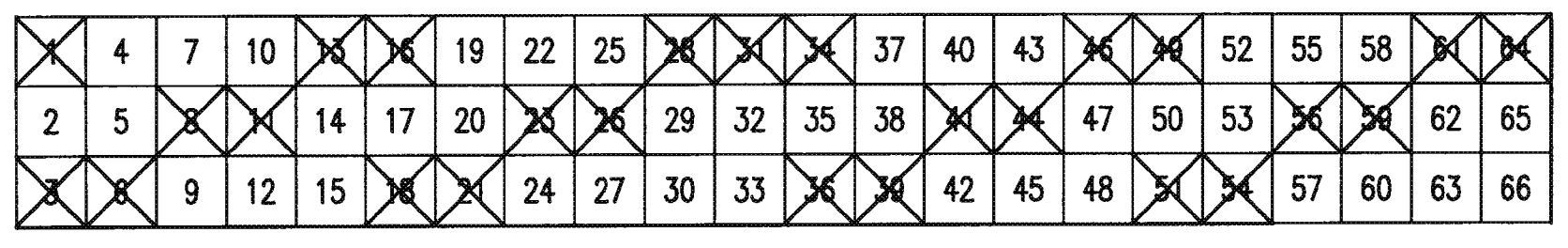

It can be observed from FIG. 5B that the HARQ ACK is transmitted in a first slot (10 bits) as per Release 7 structure. CQI, RI and PCI are transmitted in the 2nd and 3rd slots with 40 bits. A convolutional code of 1/3 code rate with puncturing pattern identifying 26 bits is recommended to encode the 14 CQI/RI/PCI information bits to 40 bits. A puncturing pattern selected per the rules in 3GPP TS 25.212 v10.2.0 results in the following puncturing pattern: [1 3 6 8 11 13 16 18 21 23 26 28 31 34 36 39 41 44 46 49 51 54 56 59 61 64]. This pattern is referred to herein as an "R99" puncturing pattern and is illustrated in FIG. 6. This puncturing pattern is not optimal.

Design Options for Rate Matching

Option 1: Convolution code with 1/3 code rate and "end" puncturing

Figure 7:
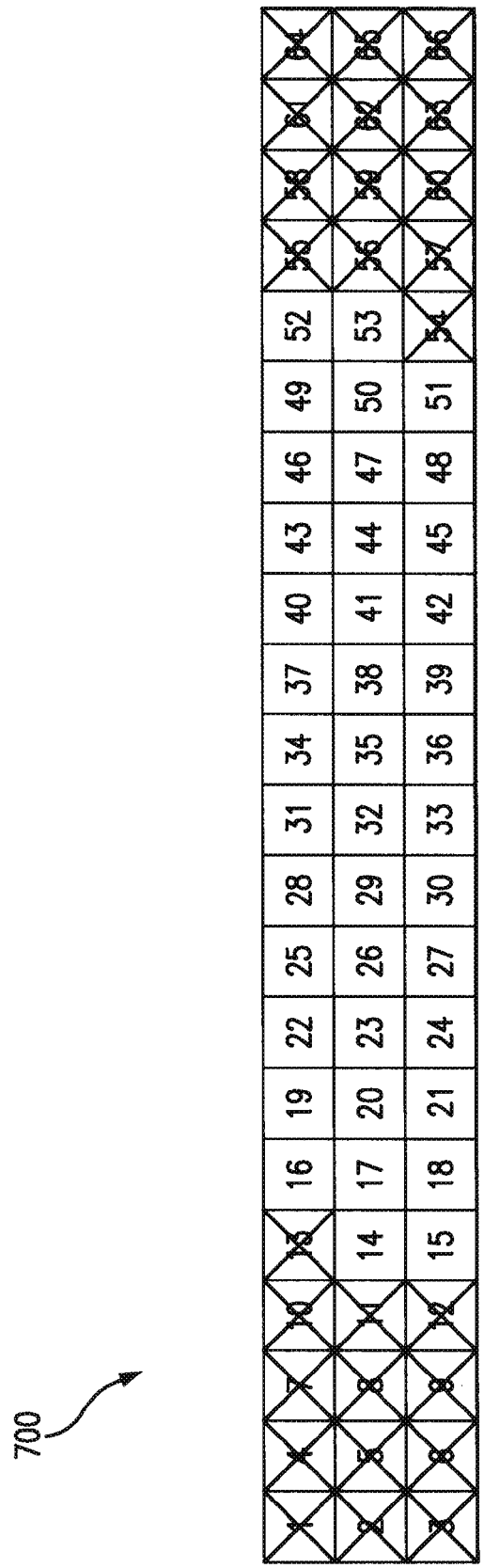
FIG. 7 illustrates an example puncturing pattern.
Figure 8:
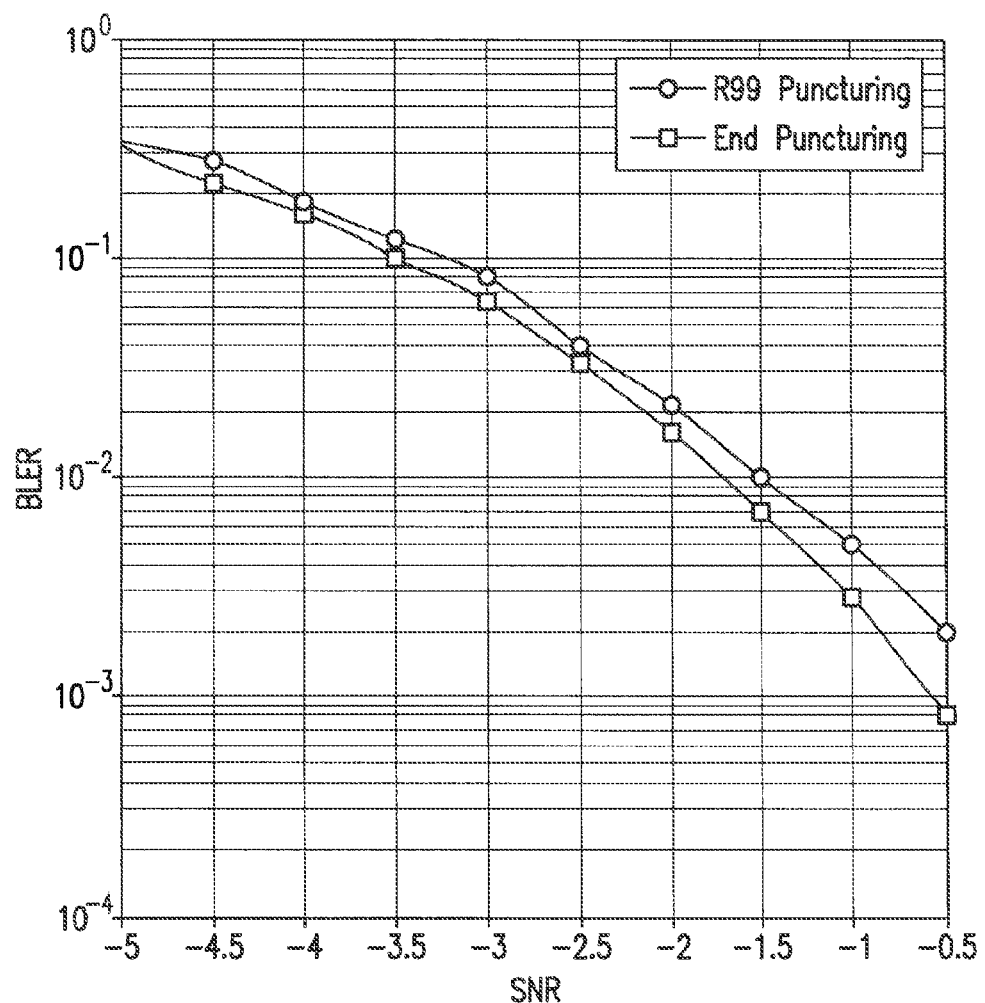
FIG. 8 shows a BLER plot.

FIG. 7 shows a puncturing pattern 700 that is rotationally symmetric and uses "end" puncturing, i.e. only beginning bits (e.g., bits 1-21) and ending bits (e.g. bits 46-66) are punctured, but not middle bits. Hence in this method all the bits are equally protected. Puncturing pattern 700 provides better results than the R99 puncturing pattern shown in FIG. 6. FIG. 8 shows the BLER plot for these two patterns. It can be seen that pattern 700 performs better than the R99 puncturing by 0.25 dB. Hence we propose that a convolutional code of rate 1/3 with the puncturing pattern [1 2 3 4 5 6 7 8 9 10 11 12 13 54 55 56 57 58 59 60 61 62 63 64 65 66] should be used, as shown in FIG. 7.

Option 2: Convolution code with 1/2 code rate and "end" puncturing

Figure 9:
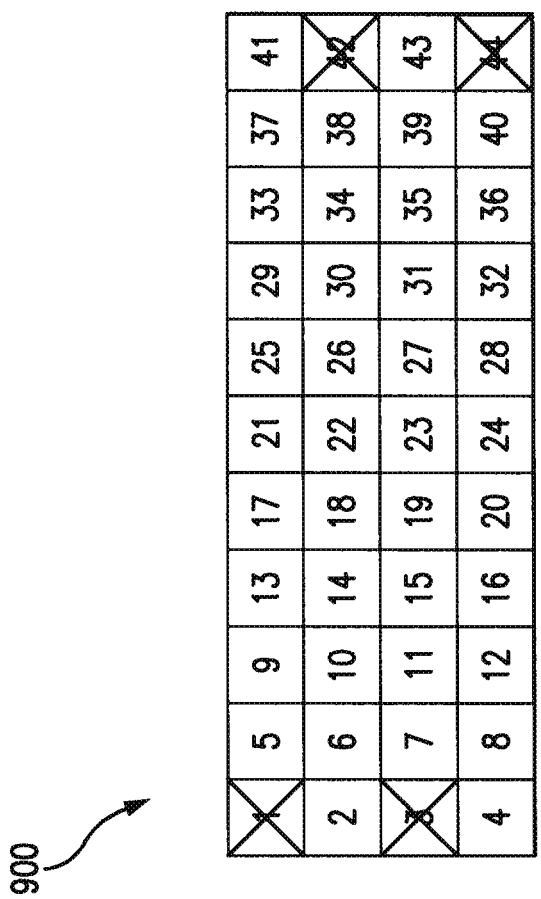
FIG. 9 illustrates an example puncturing pattern.
Figure 10:
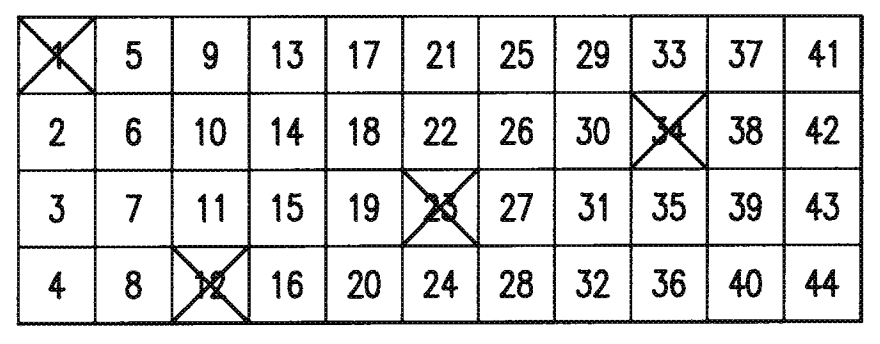
Figure 11:
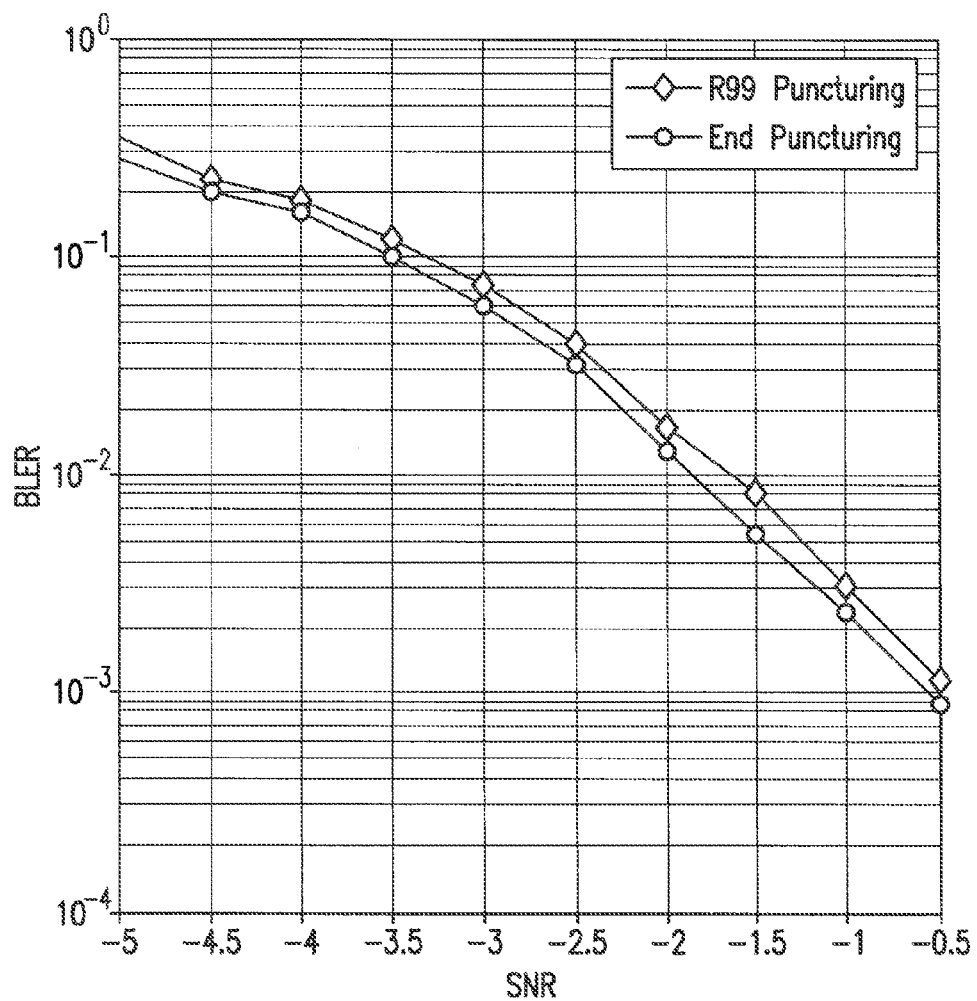
FIG. 11 shows a BLER plot.

In this option we use convolutional code with rate 1/2 and also use end puncturing. FIG. 9 shows an example puncturing pattern 900 according to option 2. As shown in FIG. 9 the puncturing patterns is [1 3 42 44]. Like puncturing pattern 700, puncturing pattern 900 is rotationally symmetric (i.e., for every bit n that is included in the pattern there is also included in the pattern a corresponding bit n', where n'=N+1−n, were N is the length of the bit sequence that is to be punctured, which in this case is 44). For a point of comparison, FIG. 10 shows an R99 puncturing pattern 1000 (i.e., a puncturing pattern using the principles outlined in 3GPP TS 25.212 v10.2.0). Puncturing pattern 1000 is not rotationally symmetric (e.g., bit 1 is included in the pattern, but bit 1's corresponding bit (i.e., bit 44) is not included). FIG. 11 shows the BLER plot for these patterns 900 and 1000. It can be seen that puncturing pattern 900 performs better than the R99 puncturing pattern 1000. Alternative end puncturing patterns for 1/2 code rate are also contemplated. For example, the following five alternative puncturing patterns provide the same (or nearly the same) result as puncturing pattern 900: (1) [1 2 43 44], (2) [1 4 41 44], (3) [2 3 42 43], (4) [2 4 41 43] and (5) [3 4 41 42]. Like pattern 700, these alternative patterns are also rotationally symmetric.

Figure 12:
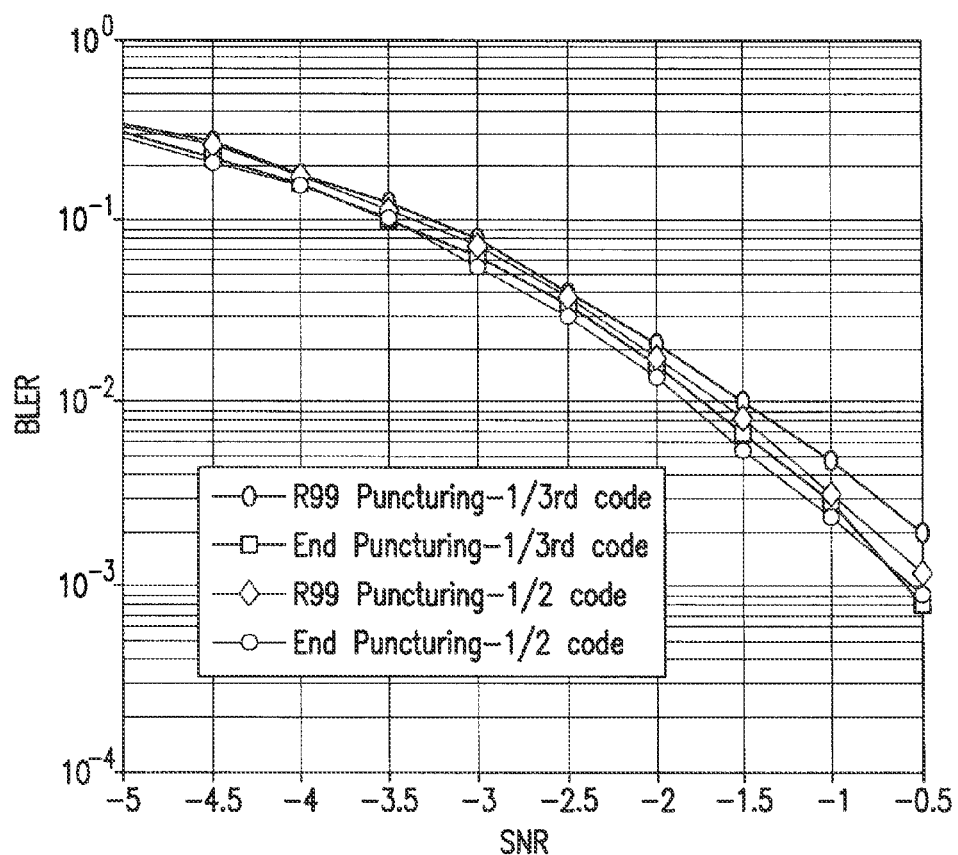
FIG. 12 shows a BLER plot.

Upon a comparison of option 1 and option 2, it can be observed that the best performance is achieved using 1/2 code rate and using an end puncturing pattern that is rotationally symmetric. See e.g., FIG. 12, which shows the BLER plot for the above described options.

Figure 14:
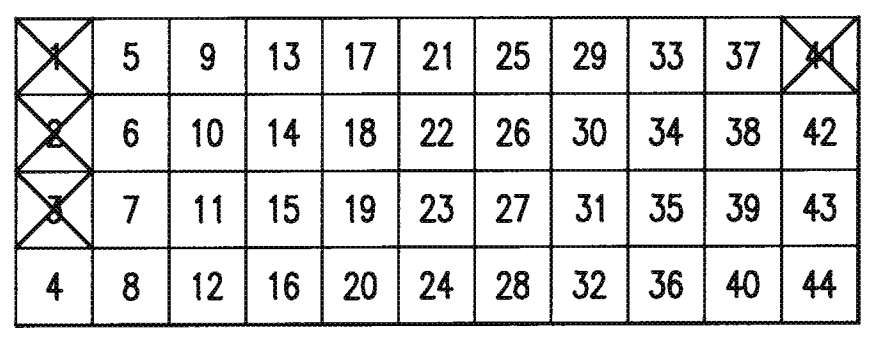
Figure 15:
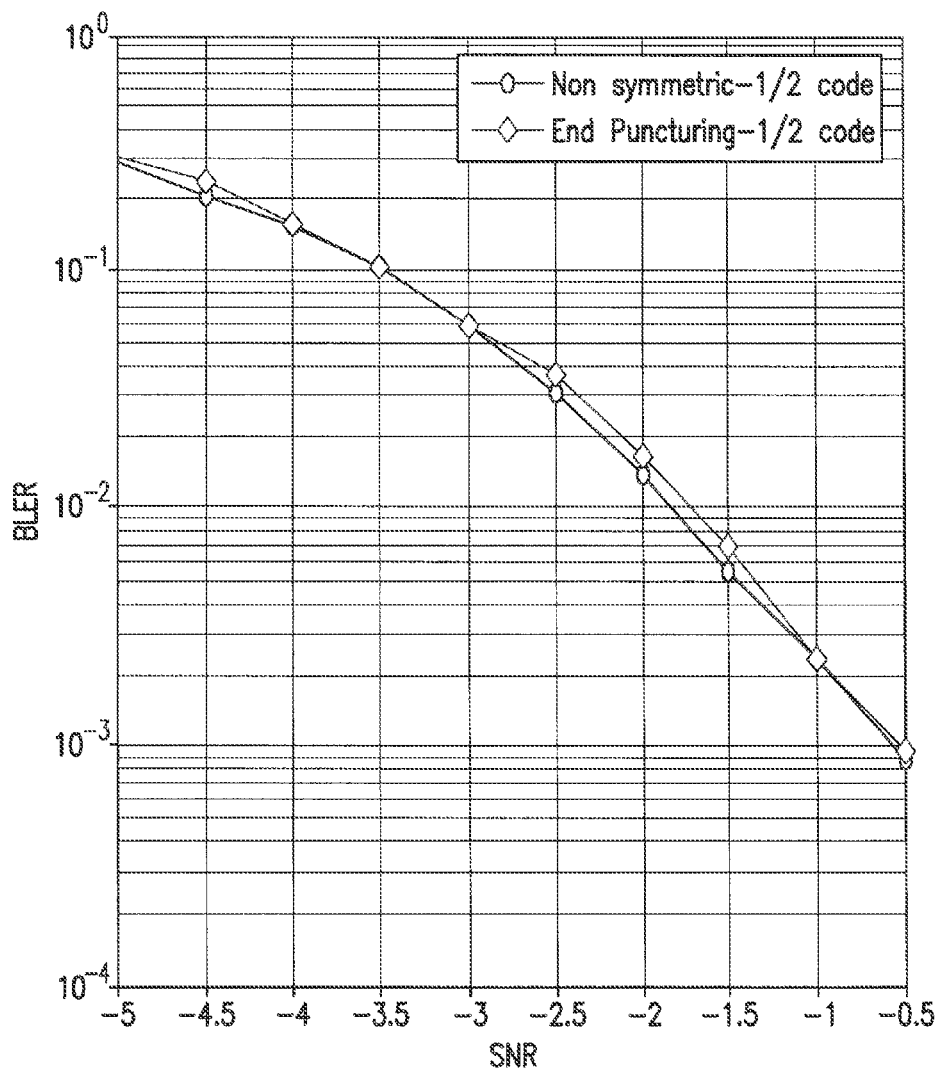
FIG. 15 shows a BLER plot.
Figure 16:
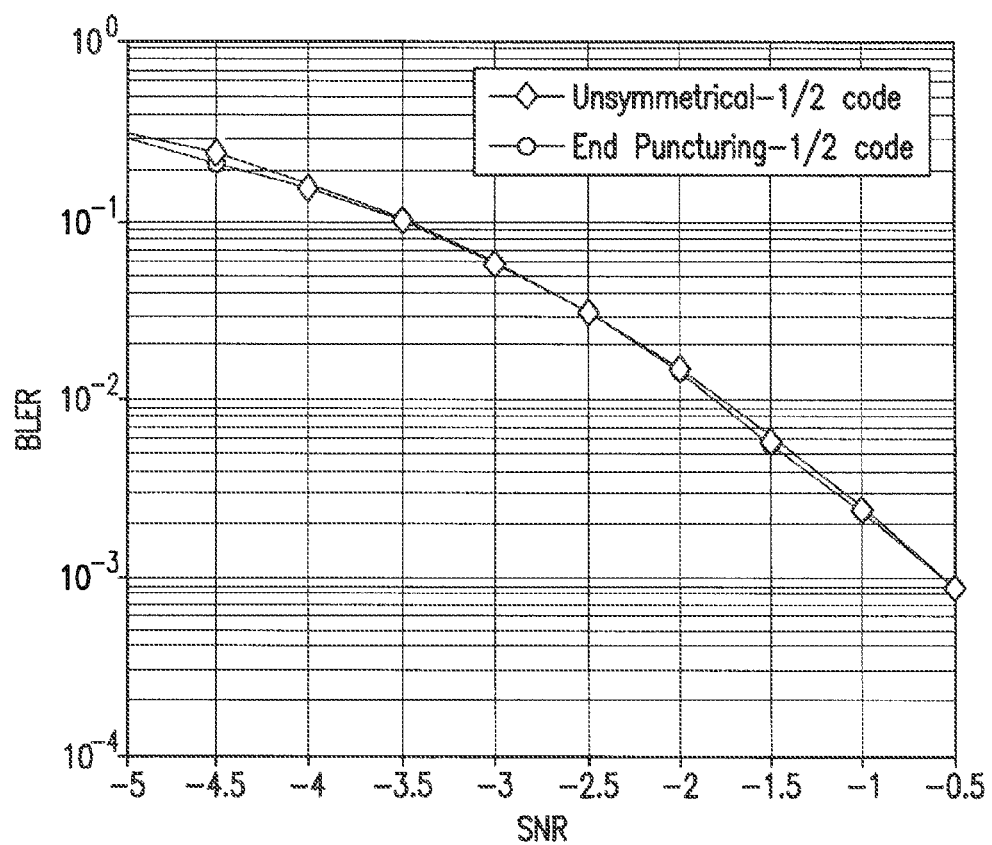
FIG. 16 shows a BLER plot.

For the sake of comparison, the simulation results achieved using non symmetric puncturing pattern is compared with simulation results achieved using rotationally symmetric puncturing pattern. FIGS. 13 and 14 shows two example non-symmetric puncturing patterns, and FIGS. 15 and 16 show the BLER for these two respective patterns (also plotted are the result with rotationally symmetric end puncturing pattern). From the plots shown in FIGS. 15 and 16, it can be argued that a puncturing pattern with rotationally symmetry gives the best performance rather than a puncturing pattern arbitrarily punctured at the beginning and the end of the code sequence. This is because with a rotationally symmetric pattern there is an equal amount of puncturing at both the ends.

An advantage of at least some of the preferred embodiments discussed herein includes requiring less power for control channel hence more throughputs for UL data traffic.

Figure 17:
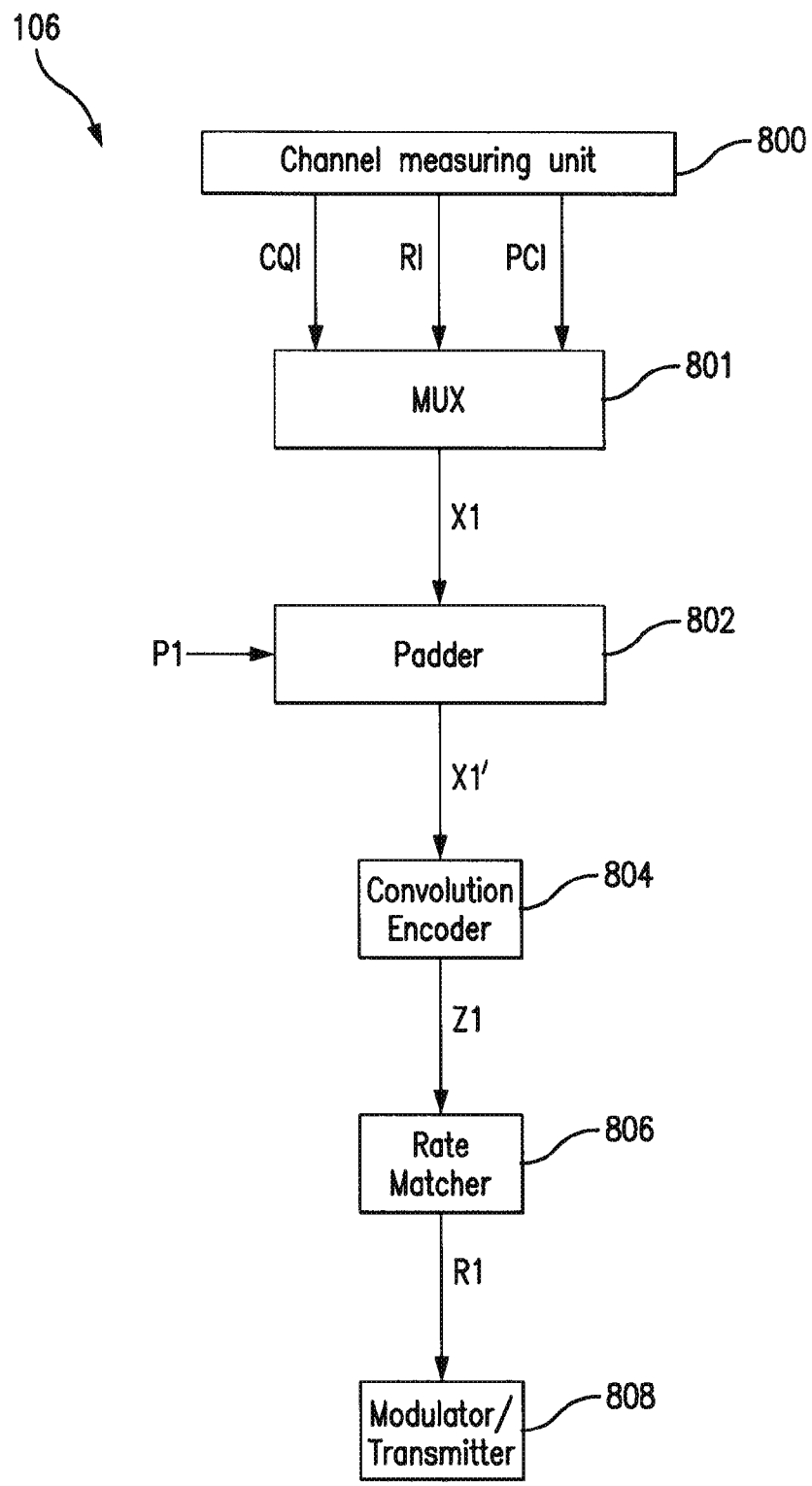
FIG. 17 is a functional block diagram of an example UE.

Referring now to FIG. 17, FIG. 17 illustrates functional components of UE 106, according to some embodiment. As shown in FIG. 17, UE 106 may include a channel measuring unit 800 for generating control information comprising a first bit sequence, a second bit sequence and a third bit sequence (e.g., CQI, RI, and PCI) to send to the base station serving the UE based on a pilot signal transmitted from the base station. The UE 106 also includes a multiplexer 801 for multiplexing the CQI, RI and PCI bits to produce bit sequence X1 (14 bits) (i.e., a fourth bit sequence). X1 is then padded by padder 802 with bit sequence P1 (P1=8 bits) to produce bit sequence X1' (X1'=22 bits) (i.e., a fifth bit sequence). X1' is then encoded by a convolutional encoder 804 to convolutionally encode X1' to produce encoded bits Z1 (i.e., a sixth bit sequence). Depending on the rate of the convolutional encoder 804, Z1 may be 44 or 66, for example. For instance, when the rate is 1/2, Z1=44 bits and when the rate is 1/3, then Z1=66 bits. The encoded bits Z1 are then punctured by a rate matcher 806 according to a pre-defined puncturing pattern to produce bit sequence R1 (i.e., a seventh bit sequence), where R1 is 40 bits in length. R1 is then spread by spreading factor 128, QPSK modulated, and transmitted. Further details are provided below.

In one embodiment, when the rate is 1/2, the following puncturing pattern is used by the rate matcher 806: [1 3 42 44]. That is, bits 1, 3, 42 and 44 are removed ("punctured") from Z1 by rate matcher 806 to produce R1.

In another embodiment, when the rate is 1/2 one of the following puncturing patterns is used by the rate matcher 806: [1 2 43 44], [1 4 41 44], [2 3 42 43], [2 4 41 43] or [3 4 41 42].

In yet another embodiment, when the rate is 1/3 and, the following puncturing pattern is used by the rate matcher 806: [1 2 3 4 5 6 7 8 9 10 11 12 13 54 55 56 57 58 59 60 61 62 63 64 65 66].

Figure 18:
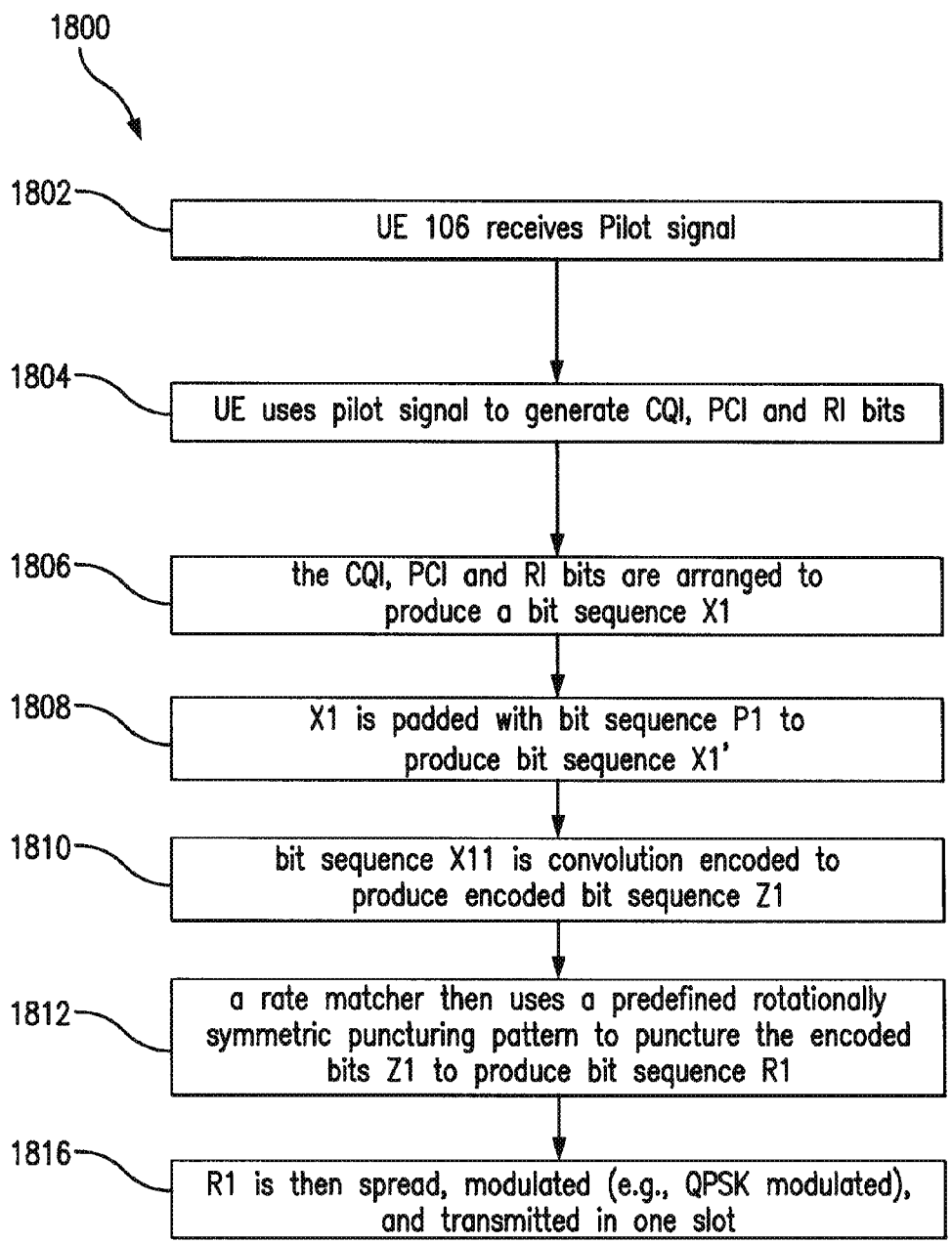
FIG. 18 is a flow chart illustrating a process according to some embodiments.

Referring now to FIG. 18, FIG. 18 is a flow chart illustrating a process 1800 according to some embodiments, which process may be performed by UE 106. Process 1800 may begin in step 1802, where UE 106 receives a pilot signal.

In step 1804, the UE uses pilot signal to generate CQI, PCI and RI bits (i.e. three bit sequences).

In step 1806, the CQI, PCI and RI bits are arranged to produce a bit sequence X1, i.e., a fourth bit sequence, (in some embodiments X1 is fourteen bits). In some embodiments, the first portion of X1 (e.g., the first 8 bits of X1) identify a CQI, the next portion of X1 (e.g., the next 2 bits) identify an RI, and the last portion of X1 (e.g., the next four bits of X1) identify a PCI.

Next (step 1808), X1 is padded with bit sequence P1 (in some embodiments P1 is eight bits in length) to produce bit sequence X1' (i.e., a fifth bit sequence).

Next (step 1810) bit sequence X1' is convolution encoded to produce encoded bit sequence Z1 (i.e., a sixth bit sequence). Depending on the length of X1' and on the rate of the convolutional encoder, Z1 may be, for example, 44 or 66 bits, for example. For instance, when X1' is 22 bits and the rate is 1/2, then Z1=44 bits and when X1' is 22 bits and the rate is 1/3, then Z1=66 bits.

Next (step 1812) the encoded bits Z1 are then punctured by a rate matcher using a predefined rotationally symmetric puncturing pattern to produce bit sequence R1 (i.e., a seventh bit sequence) (in some embodiments Z1 is punctured such that R1 is 40 bits in length).

R1 is then spread (e.g., by spreading factor 188), modulated (e.g., QPSK modulated), and transmitted (step 1816).

While various embodiments have been described above, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for encoding control information generated by a user equipment, UE, the control information comprising a first bit sequence, a second bit sequence, and a third bit sequence, the method comprising:

arranging said bit sequences to produce a bit sequence X1;

padding the bit sequence X1 with a bit sequence P1 to produce a bit sequence XI';

convolution encoding the bit sequence XI' to produce an encoded bit sequence Z1; and puncturing the bit sequence Z1 using a predefined puncturing pattern to produce a bit sequence R1, wherein the predefined puncturing pattern is a rotationally symmetric puncturing pattern, wherein for each bit n included in the puncturing pattern there exists another bit n' that is also included in the puncturing pattern, wherein n'=N+1−n, where N is the bit length of Z1.

2. The method of claim 1, wherein the bit sequence Z1 consists of 44 bits, and the predefined puncturing pattern is [1 3 42 and 44].

3. The method of claim 1, wherein the bit sequence Z1 consists of 44 bits, and puncturing the bit sequence Z1 using the predefined puncturing pattern to produce the bit sequence R1 comprises removing the first bit, the third bit, the forty-second bit, and the forty-fourth bit from the bit sequence Z1.

4. The method of claim 1, wherein the first bit sequence is a channel quality indicator, CQI, value;

the second bit sequence is a precoding control indicator, PCI, value.

5. The method of claim 4, wherein the third bit sequence is value identifying a preferred number of layers.

6. The method of claim 1, wherein
the bit sequence X1 consists of fourteen bits, and
the bit sequence P1 consists of eight bits.

7. The method of claim 6, wherein convolution encoding the bit sequence X1' to produce the encoded bit sequence Z1 comprises convolution encoding the bit sequence X1' using rate 1/2 convolutional encoding.

8. A user equipment (UE) adapted to:
generate control information, the control information comprising a first bit sequence, a second bit sequence, and a third bit sequence, and further comprising:
a multiplexer adapted to arrange said bit sequences to produce a bit sequence X1;
a padder adapted to pad the bit sequence X1 with a bit sequence P1 to produce a bit sequence XI';
a convolutional encoder adapted to convolution encode the bit sequence XI' to produce an encoded bit sequence Z1; and
a rate matcher adapted to puncture the bit sequence Z1 using a predefined puncturing pattern to produce a bit sequence R1, wherein
the predefined puncturing pattern is a rotationally symmetric puncturing pattern, wherein for each bit n included in the puncturing pattern there exists another bit n' that is also included in the puncturing pattern, wherein n'=N+1−n, where N is the bit length of Z1.

9. The UE of claim 8, wherein
the bit sequence Z1 consists of 44 bits, and
the predefined puncturing pattern is [1 3 42 and 44].

10. The UE of claim 8, wherein
the bit sequence Z1 consists of 44 bits, and
the UE is adapted to puncture the bit sequence Z1 using the predefined puncturing pattern to produce the bit sequence R1 by removing the first bit, the third bit, the forty-second bit, and the forty-fourth bit from the bit sequence Z1.

11. The UE of claim 8, wherein
the first bit sequence is a channel quality indicator, CQI, value;
the second bit sequence is a precoding control indicator, PCI, value.

12. The UE of claim 11, wherein the third bit sequence is value identifying a preferred number of layers.

13. The UE of claim 8, wherein
the bit sequence X1 consists of fourteen bits, and
the bit sequence P1 consists of eight bits.

14. The UE of claim 13, wherein the UE is adapted to convolution encode the bit sequence X1' to produce the encoded bit sequence Z1 by convolution encoding X1' the bit sequence using rate 1/2 convolutional encoding.

15. An apparatus for encoding control information, the control information comprising a first bit sequence, a second bit sequence, and a third bit sequence, the apparatus comprising:
a multiplexor adapted to multiplex said bit sequences to produce a bit sequence X1;
a padder adapted to pad the bit sequence X1 with a bit sequence P1 to produce a bit sequence X1';
a convolution encoder adapted to convolution encode the bit sequence XI' to produce an encoded bit sequence Z1; and
a rate matcher adapted to puncture the bit sequence Z1 using a predefined puncturing pattern to produce a bit sequence R1, wherein for each bit n included in the puncturing pattern there exists another bit n' that is also included in the puncturing pattern, wherein n'=N+1−n, where N is the bit length of Z1, wherein the predefined puncturing pattern is a rotationally symmetric puncturing pattern.

16. The apparatus of claim 15, wherein
the bit sequence Z1 consists of 44 bits, and
the predefined puncturing pattern is [1 3 42 and 44].

17. The apparatus of claim 15, wherein
the bit sequence Z1 consists of 44 bits, and
the rate matcher is adapted to puncture the bit sequence Z1 using the predefined puncturing pattern to produce the bit sequence R1 by removing the first bit, the third bit, the forty-second bit, and the forty-fourth bit from the bit sequence Z1.

18. The apparatus of claim 15, wherein
the first bit sequence is a channel quality indicator, CQI, value;
the second bit sequence is a precoding control indicator, PCI, value.

19. The apparatus of claim 18, wherein the third bit sequence is value identifying a preferred number of layers.

20. The apparatus of claim 15, wherein
the bit sequence X1 consists of fourteen bits, and
the bit sequence P1 consists of eight bits.

21. The apparatus of claim 20, wherein the convolution encoder is adapted to convolution encode the bit sequence X1' to produce the encoded bit sequence Z1 by convolution encoding X1' the bit sequence using rate 1/2 convolutional encoding.

* * * * *